US012117054B2

(12) United States Patent
Sandrasekaran et al.

(10) Patent No.: US 12,117,054 B2
(45) Date of Patent: Oct. 15, 2024

(54) BRAKE PAD FOR A VEHICLE, A BRAKE ARRANGEMENT, A BRAKE SYSTEM, AND A VEHICLE

(71) Applicant: Volvo Truck Corporation, Gothenburg (SE)

(72) Inventors: Ramachandran Sandrasekaran, Karnataka (IN); Kent Augustsson, Bollebygd (SE); Marcel Palmgren, Torslanda (SE); Martin Petersson, Sävedalen (SE)

(73) Assignee: Volvo Truck Corporation, Gothenburg (SE)

( * ) Notice: Subject to any disclaimer, the term of this patent is extended or adjusted under 35 U.S.C. 154(b) by 463 days.

(21) Appl. No.: 17/601,518

(22) PCT Filed: Apr. 12, 2019

(86) PCT No.: PCT/EP2019/059527
§ 371 (c)(1),
(2) Date: Oct. 5, 2021

(87) PCT Pub. No.: WO2020/207601
PCT Pub. Date: Oct. 15, 2020

(65) Prior Publication Data
US 2022/0163079 A1 May 26, 2022

(51) Int. Cl.
*F16D 65/09* (2006.01)
*F16D 65/00* (2006.01)
*F16D 65/097* (2006.01)

(52) U.S. Cl.
CPC ..... *F16D 65/0006* (2013.01); *F16D 65/0978* (2013.01)

(58) Field of Classification Search
CPC ............. F16D 55/2262; F16D 65/0006; F16D 65/0978; F16D 2127/06
See application file for complete search history.

(56) References Cited

U.S. PATENT DOCUMENTS 3,236,335 A * 2/1966 Dowell ................. F16D 55/228
188/72.5
4,401,194 A 8/1983 Klassen
(Continued)

FOREIGN PATENT DOCUMENTS

BR 7103294 A 4/1973
CN 101144512 A 3/2008
(Continued)

OTHER PUBLICATIONS

First Office Action for Chinese Patent Application No. 201980095197. 2, mailed Dec. 19, 2023, 10 pages.
(Continued)

*Primary Examiner* — Bradley T King
(74) *Attorney, Agent, or Firm* — Withrow & Terranova, PLLC (57) ABSTRACT

The invention relates to a brake pad for a vehicle, adapted to be connected to a carrier around a rotatable brake disc which rotates around a geometrical centre axis, the brake pad comprising an upper side, a lower side, a friction surface extending downwardly from the upper side to the lower side and being adapted to be pressed against a brake disc, an opposite surface extending downwardly from the upper side to the lower side and being adapted to be faced away from the brake disc, wherein the lower side comprises at least one sliding portion configured to slide against a mating sliding portion of a carrier, wherein the at least one sliding portion extends downwards towards the opposite surface.

15 Claims, 9 Drawing Sheets

(56) References Cited

U.S. PATENT DOCUMENTS

| | | | |
|---|---|---|---|
| 5,467,847 A * | 11/1995 | Antony | F16D 55/227 |
| | | | 188/73.43 |
| 2008/0006489 A1 | 1/2008 | Morio et al. | |
| 2019/0024741 A1 | 1/2019 | Taylor et al. | |
| 2020/0386286 A1* | 12/2020 | Pierangelo | F16D 65/0075 |
| 2022/0290727 A1* | 9/2022 | Svensson | F16D 65/0978 |
| 2023/0108312 A1* | 4/2023 | Palmgren | F16D 65/0978 |
| | | | 188/73.38 |

FOREIGN PATENT DOCUMENTS

| | | |
|---|---|---|
| CN | 101821527 A | 9/2010 |
| CN | 106460975 A | 2/2017 |
| DE | 102015122585 A | 6/2017 |
| EP | 3357805 A1 | 8/2018 |
| FR | 2071083 A5 | 9/1971 |
| GB | 1302745 A | 1/1973 |
| WO | 0066907 A1 | 11/2000 |
| WO | 02086344 A1 | 10/2002 |
| WO | 2015050638 A1 | 4/2015 |
| WO | 2018116038 A1 | 6/2018 |

OTHER PUBLICATIONS

International Search Report and Written Opinion for PCT/EP2019/059527, mailed Feb. 4, 2020, 12 pages.
Second Office Action for Chinese Patent Application No. 201980095197.2, mailed Jul. 10, 2024, 16 pages.

\* cited by examiner

BRAKE PAD FOR A VEHICLE, A BRAKE ARRANGEMENT, A BRAKE SYSTEM, AND A VEHICLE

This application is a 35 USC 371 national phase filing of International Application No. PCT/EP2019/059527, filed Apr. 12, 2019, the disclosure of which is incorporated herein by reference in its entirety.

TECHNICAL FIELD

The invention relates to a brake pad for a vehicle, adapted to be connected to a carrier around a rotatable brake disc. The invention also relates to a brake arrangement comprising such a brake pad and a carrier. The invention further relates to a brake system comprising such a brake arrangement and a brake disc. The invention also relates to a vehicle comprising such a brake pad, such a brake arrangement or such a brake system.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

Disc brakes are available in different forms and variants. Commonly, a caliper is used for pressing or squeezing brake pads against a brake disc to create friction. The friction slows down the rotation of the vehicle axle to which the brake disc is connected, thereby reducing the speed of the vehicle. Normally, when a driver presses the brake pedal, fluid pressure activates and forces the brake pads towards the brake disc. The caliper is deflected during brake application and springs back into its original position after brake release. However, the brake pads may not fully retract after the brake is released. This lead to a residual contact between the brake pad and the brake disc and hence generates drag. This drag affects fuel efficiency and increases the wear of the brake pad and brake disc.

An example of a disc brake is disclosed in GB 1 302 745 A. The disc brake is designed to reduce noise. The disc brake comprises a pad assembly adapted to be urged against a disc by a brake motor. The pad assembly comprises a lining block of friction material which is attached to a support plate. The support plate has lateral ends which slide in, and are circumferentially retained by, a fixed support for their reception. However, even though the lateral ends may slide in the circumferential support, the problem of drag is not solved by such a design.

SUMMARY

An object of the invention is to provide a brake pad which alleviates the above-mentioned drawback of the prior art.

According to a first aspect of the invention, the object is achieved by a brake pad according to claim 1. Thus, according to the first aspect of the invention, there is provided a brake pad for a vehicle. The brake pad is adapted to be connected to a carrier around a rotatable brake disc which rotates around a geometrical centre axis. The brake pad comprises:
an upper side,
a lower side,
a friction surface extending downwardly from the upper side to the lower side and being adapted to be pressed against a brake disc,
an opposite surface extending downwardly from the upper side to the lower side and being adapted to be faced away from the brake disc,
wherein the lower side comprises at least one sliding portion configured to slide against a mating sliding portion of a carrier, wherein the at least one sliding portion extends downwards towards the opposite surface.

By the provision of a brake pad which has a sliding portion that extends downwards (for instance obliquely or in a curvature) towards the opposite surface of the pad that is adapted to be faced away from the brake disc, the brake pad will due to gravitation and vibrations move away from the brake disc, when the driver has released the brake pedal. Thereby, the risk of drag is reduced. Thus, the present inventors have realised that by designing the sliding portion of the brake pad according to the inclined plane principle, the brake pad will at least due to the gravitational force move away from the brake disc, provided that there is an appropriately low friction coefficient between the sliding portion of the brake pad and a mating sliding portion of a carrier on which the brake pad is intended to slide. Vehicle vibrations further add to urge the brake pad to move in the retracting direction when no brake force is applied by the driver.

The geometrical design of the sliding portion is also advantageous because it allows retraction of the brake pad without any extra retracting mechanisms, instead the inventive configuration takes advantage of gravitation, which may be assisted by vibrations, such as axle vibrations.

It should be understood that in this application directional terms such as "upper" and "lower" relate to the normal use of the brake pad. Thus, in normal use, when properly mounted the upper side of the brake pad will be located above the lower side of the brake pad when the vehicle on which the brake pad is mounted stands on horizontal ground. The friction surface extends between the upper side and the lower side. Furthermore, if one imagines an upper geometrical plane in which the upper side (but not the friction surface) is located, and a lower geometrical plane in which the lower side (but not the friction surface), then the terms "downwards" or "downwardly", indicate a direction which extends from the upper geometrical plane to the lower geometrical plane. It should be noted that downward or downwardly does not need to be a direction perpendicular to said upper and lower geometrical planes, but could be an oblique or curved direction relative to said planes.

It should also be understood that for a brake pad which is intended to be used in a caliper which is to be mounted on top of the brake disc (at "12 o'clock") the upper and lower sides will be configured and dimensioned differently than for a brake pad which is intended to be used in a caliper which is to be mounted at a 90° displaced position on the brake disc (at "3 or 9 o'clock"). In the first case, the upper and lower sides of the brake pad may have a relatively longer extension and the lower side is intended to face the geometrical centre axis of the brake disc. In the second case, the upper and lower sides of the brake pad may have a relatively shorter extension and a lateral side may instead be intended to face the geometrical centre axis of the brake disc (such a lateral side would suitably interconnect the upper and lower sides and would suitably also interconnect the friction surface and the opposite surface).

It should also be understood, that in this application, when a driver applies a brake, for simplicity reference will consistently be made to a driver pressing a brake pedal. However, it should be noted that the invention is not limited to implementations in connection with brake pedals, but other means for applying the brake are also conceivable. For instance, instead of a brake pedal, the brakes may be actuated by means of hand-operated controls, such as handles or joysticks. For instance, driver's cabins may be designed for handicap controlled operation.

According to at least one exemplary embodiment, the at least one sliding portion extends obliquely downwards towards the opposite surface. An oblique inclination is a simple way to manufacture a downwardly extending sliding portion.

According to at least one exemplary embodiment, the at least one sliding portion extends in a curvature (for instance the sliding portion may have a radius) downwards towards the opposite surface. This may be advantageous if, for instance, mated with a non-curved sliding portion of a carrier, in which case there would be a line contact instead of an area contact between the mating sliding portions, thereby reducing the friction between the mating sliding portions.

According to at least one exemplary embodiment, the brake pad comprises a backing part and a consumable lining part fixedly mounted to the backing part, wherein the friction surface is provided on the lining part and the opposite surface is provided on the backing part, wherein the downwardly extending sliding portion is formed by both the backing part and the lining part. By having the sliding portion formed by both the backing part and the lining part, a longer sliding surface is achievable.

According to at least one exemplary embodiment, the at least one sliding portion extends from the friction surface to the opposite surface, thereby interconnecting the friction surface with the opposite surface. This is advantageous as the tapering of the sliding portion may extend all the way from one side to the other side. It should be noted however, that the sliding portion, does not need to cover the entire lower side. For instance, in some exemplary embodiment the sliding portion may form one or more tapering band-like portions across the lower side of the brake pad, i.e. extending from the friction surface to the opposite surface, while other portions of the lower side may or may not be tapering. In some exemplary embodiments, the entire lower side may be a tapering sliding portion.

According to at least one exemplary embodiment, the friction surface extends in a geometrical plane, wherein the at least one sliding portion extends at an angle of 3°-45°, such as 5°-30°, for example 7°-15° relative to a normal to said geometrical plane. Said ranges have been found advantageous for returning the brake pad after release of the brake pedal by means of gravitation assisted by any vibration.

According to at least one exemplary embodiment, the brake pad comprises at least two sliding portions spaced apart from each other. According to at least one exemplary embodiment, said two sliding portions are located on respective sides of a plane of symmetry of the brake pad. This may provide for a balanced and stable retraction, and by not having the entire lower side presenting a sliding portion, the friction between the brake pad and a carrier on which the brake pad is to be mounted may be reduced, thereby improving the sliding ability.

According to at least one exemplary embodiment, the upper side is adapted to face away from a geometrical centre axis of a brake disc, wherein the lower side is adapted to face in a direction towards said geometrical centre axis, wherein the friction surface is adapted to be pressed against the brake disc above said geometrical centre axis. This configuration of the brake pad is suitable for use in a caliper intended to be mounted at the top of the brake disc.

According to at least one exemplary embodiment, the brake pad comprises a lateral side extending in one direction from the upper side to the lower side and extending in another direction from the friction surface to the opposite surface, wherein the lateral side is adapted to face in a direction towards said geometrical centre axis. This configuration of the brake pad is suitable for use in a caliper intended to be mounted at a lateral side of the brake disc (i.e. along the periphery of the brake disc between the top and bottom of the brake disc, which is popularly referred to as at "3 o'clock" or at "9 o'clock").

According to a second aspect of the invention, the object is achieved by a brake arrangement according to claim 11. Thus, according to the second aspect of the invention, there is provided a brake arrangement comprising a brake pad of the first aspect of the invention and a carrier adapted to be mounted to a rotatable brake disc, wherein the sliding portion of the brake pad is a first sliding portion, wherein the carrier comprises a second sliding portion mating with the first sliding portion, wherein the brake pad with the first sliding portion is enabled to slide along the second sliding portion towards and away from the brake disc. By providing a carrier with designated mating second sliding portion the interaction between the brake pad and the carrier can be efficiently controlled. For instance, the angle of inclination, the length of extension and the surface smoothness may be design parameters which may be appropriately dimensioned.

According to at least one exemplary embodiment the second sliding portion (i.e. of the carrier) and the first sliding portion (i.e. of the brake pad) have the same angle of inclination relative to the friction surface of the brake pad. By having the same angle of inclination a continuous interface may be obtained between the sliding portions, whereby an efficient movement of the brake pad along the carrier and away from the brake disc is achievable. In other exemplary embodiments, the brake arrangement may have a brake pad with a sliding portion having a curved extension downwards towards the opposite surface, mating with a non-curved or differently curved sliding portion of the carrier, whereby a line contact between the first sliding portion and the second sliding portion is obtained, thereby reducing the friction between the first and second sliding portions.

According to at least one exemplary embodiment, the brake arrangement further comprises a spring element urging the first sliding portion against the second sliding portion by a downwardly directed spring force. This is advantageous in that an extra force is provided in addition to vibrational and/or gravitational forces, thereby further improving the retraction of the brake pad from the brake disc after a driver has released the brake pedal.

According to a third aspect of the invention, the object is achieved by a brake system according to claim 14. Thus, according to the third aspect of the invention, there is provided a brake system comprising a brake arrangement of the second aspect and a brake disc which is rotatable around a geometrical centre axis, wherein the carrier is mounted so as to enable the friction surface of the brake pad to be pressed against the brake disc when the brake pad is subjected to a force directed towards the brake disc.

According to at least one exemplary embodiment, the first sliding portion and the second sliding portion taper downwardly, such as towards the geometrical centre axis as seen in a direction facing away from the brake disc, wherein the tapering enables the brake pad to move away from the brake disc due to vibrations and/or gravitation. Thus, when the brake pad has been mounted, the sliding portion will taper downwardly as it extends from the friction surface to the opposite surface.

According to a fourth aspect of the invention, the object is achieved by a vehicle. Thus, according to the fourth aspect of the invention, there is provided a brake pad of the first aspect, a brake arrangement of the second aspect, or a brake system of the third aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
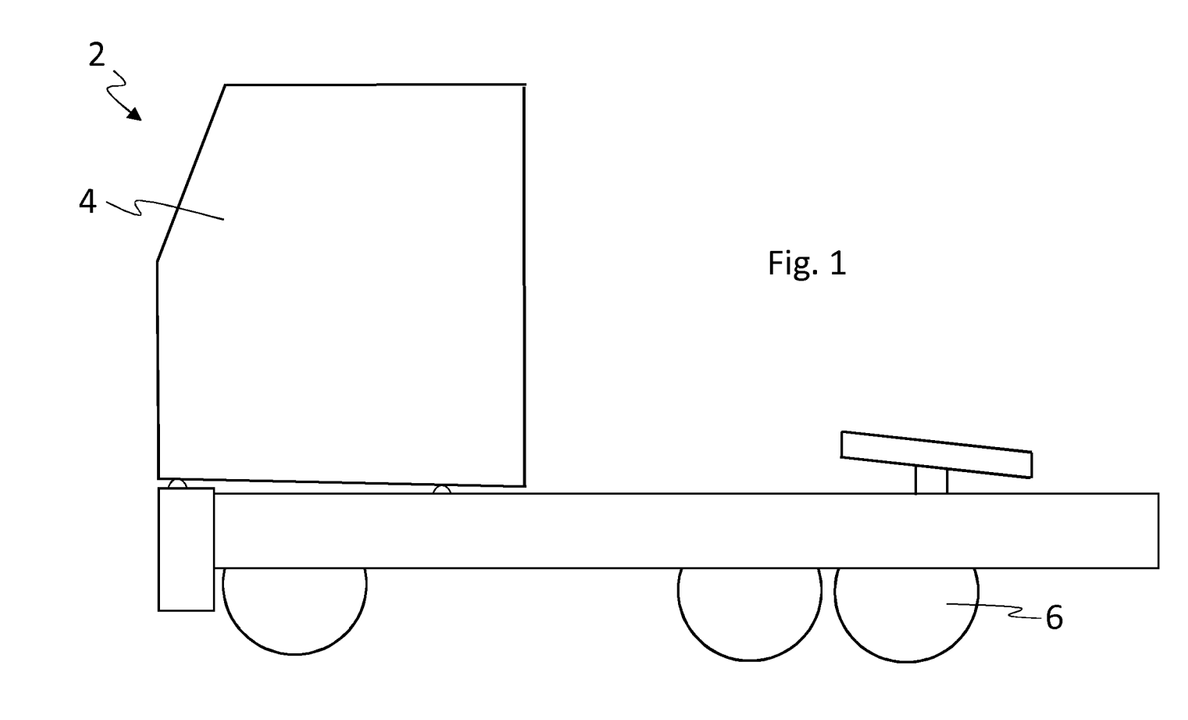
FIG. 1 is a schematic illustration of a vehicle, in accordance with at least one exemplary embodiment of the invention.

FIG. 1 is a schematic illustration of a vehicle 2, in accordance with at least one exemplary embodiment of the invention. Although the vehicle 2 is illustrated in the form of a truck, other types of vehicles, such as busses, construction equipment, trailers or passenger cars may be provided in accordance with the invention.

The truck (vehicle) comprises a cab 4 in which a driver may operate the vehicle. The vehicle comprises a number of road wheels 6, herein illustrated as three pairs of wheels, however in other embodiments there may be a different number of wheels, such as two pairs, four pairs or more. In the cab 4 a driver may press a brake pedal with his/her foot in order to activate the brake or brakes. Activation of the brake causes brake pads to be pressed against a brake disc (not illustrated in FIG. 1) connected to an axle that rotates the road wheels.

Figures 2A, 2B, 2C:
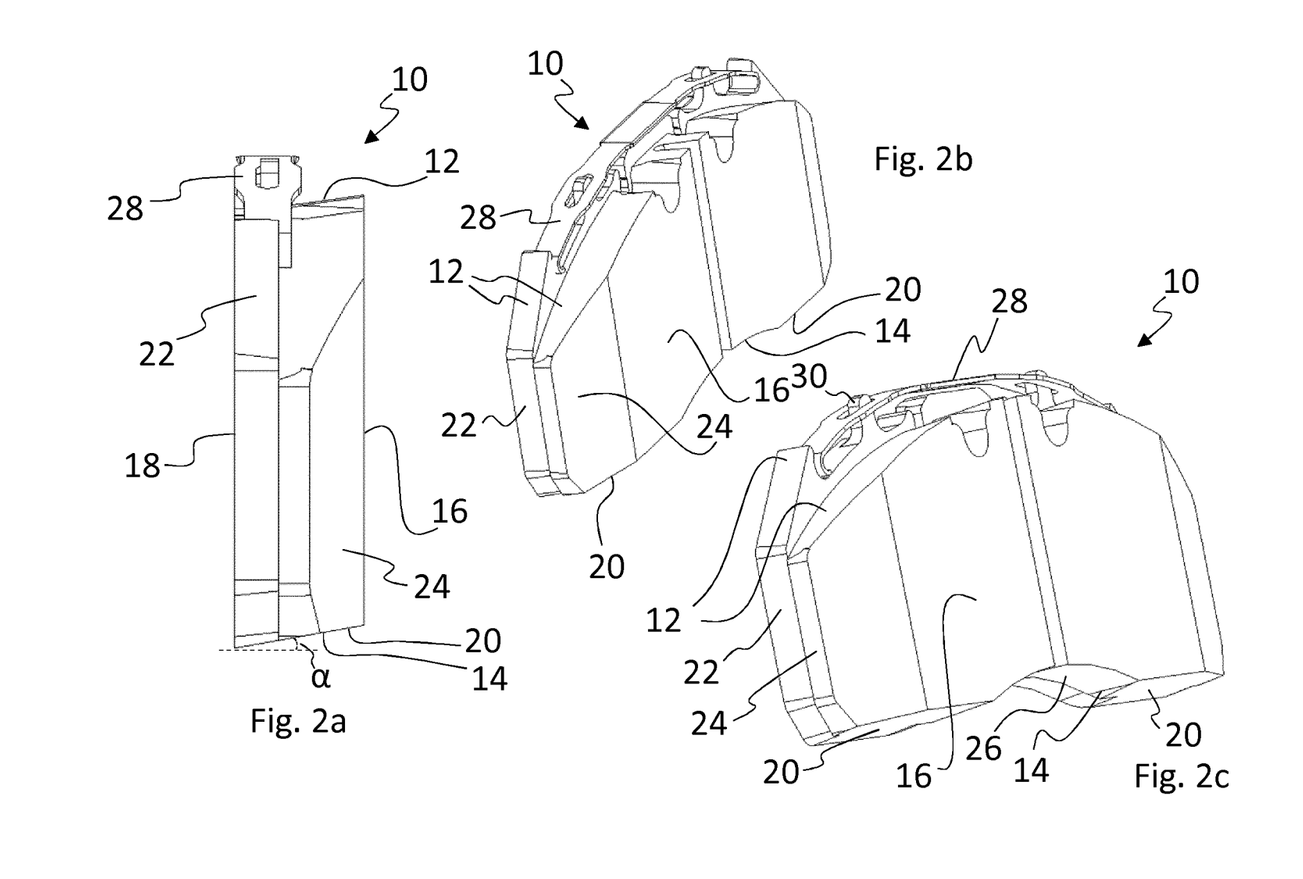
FIGS. 2a-2c illustrate a brake pad in accordance with at least one exemplary embodiment of the invention.

FIGS. 2a-2c illustrate a brake pad 10 in accordance with at least one exemplary embodiment of the invention. FIG. 2a is an end view of the brake pad 10, FIG. 2b is a perspective view from above, and FIG. 2c is a perspective view from below.

The brake pad 10 is intended to be used in a vehicle, such as a vehicle schematically exemplified in FIG. 1. More specifically, the brake pad 10 is adapted to be connected to a carrier around a rotatable brake disc which rotates around a geometrical centre axis.

The brake pad 10 comprises an upper side 12 adapted to face away from a geometrical centre axis of a brake disc. When a vehicle stands on horizontal ground, the upper side 12 will be at a higher horizontal level than the geometrical centre axis of the brake disc, and thus at a higher level than the wheel axle. The upper side 12 will be directed away from the ground, facing upwards. As can be seen in FIGS. 2a-2c, the upper side 12, does not need to be confined to one horizontal plane, but may have different levels all facing upwards.

The brake pad 10 comprises a lower side 14 adapted to face in a direction towards said geometrical centre axis. Thus, the upper side 12 and the lower side 14 face in substantially opposite directions.

A friction surface 16 extends downwardly from the upper side 12 to the lower side 14 and is adapted to be pressed against a brake disc above said geometrical centre axis. The material of the friction surface 16 may for instance comprise non-metallic materials, such as synthetic substances bonded into a composite, or semi-metallic materials, such as synthetics mixed with varying proportions of flaked metals, or ceramic materials, or fully metallic materials.

The frictions surface 16 is adapted to face the brake disc. On the other side of the brake pad 10 there is an opposite surface 18 (see FIG. 2a) extending downwardly from the upper side 12 to the lower side 14. The opposite surface 18 is adapted to be faced away from the brake disc.

The lower side 14 comprises at least one sliding portion 20 configured to slide against a mating sliding portion of a carrier. In the exemplary embodiment of FIG. 2c two sliding portions 20 are illustrated, however, other number of sliding portions such as one, three, four or more is conceivable. The at least one sliding portion 20 extends obliquely downwards towards the opposite surface.

As illustrated in FIGS. 2a-2c, the brake pad 10 comprises a backing part 22 and a consumable lining part 24 fixedly mounted to the backing part 22, wherein the friction surface 16 is provided on the lining part 24 and the opposite surface 18 is provided on the backing part 22, wherein the obliquely extending sliding portions 20 are formed by both the backing part 22 and the lining part 24. The backing part 22 and the consumable lining part 24 may have substantially the same thickness, or as illustrated in FIG. 2a, the consumable lining part 24 may be somewhat thicker than the backing part 22. The friction surface 16 may suitably be formed by the consumable lining part 24. The backing part 22 may, for instance, be made of metal, such as steel. The backing part 22 may be regarded as a backing plate providing support to the consumable friction material, the lining part 24.

In the exemplary embodiment of FIGS. 2a-2c there are two sliding portions 20 on the lower side 14, each one formed by both the backing part 22 and the lining part 24. Each sliding portion 20 may thus, in at least some exemplary embodiments, comprise two or more different material portions, one formed by the backing part 22 and one formed by the lining part 24. The two sliding portions 20 are located on respective sides of a plane of symmetry of the brake pad 10. As shown in for instance FIG. 2c, in at least some exemplary embodiments, the two sliding portions 20 of the brake pad 10 are separated by an arched portion 26. Such an arched portion 26 may contribute to appropriate stability and/or balancing of the brake pad 10 when mounted on a carrier.

The arched portion 26 may suitably have a contour which follows the contour of a corresponding arched portion of a carrier on which the brake pad 10 is to be mounted. In at least some exemplary embodiments, the arched portion 26 does not, contrary to the sliding portions 20, extend downwardly from the friction surface 16 towards the opposite surface 18. However, in other exemplary embodiments, the arched portion 26 may, similarly to the sliding portions 20, extend downwardly from the friction surface 16 towards the opposite surface 18.

According to at least some exemplary embodiments the sliding portions 20 constitute less than 75%, suitably less than 50% of the total area of the lower side 14 of the brake pad 10. According, to at least some exemplary embodiments, each individual continuous (i.e. non-interrupted) sliding portion 20 constitutes less than 50%, suitably less than 30% of the total area of the lower side 14. This provides for low sliding friction between the brake pad 10 and the carrier on which the brake pad 10 is to be mounted.

As illustrated in FIGS. 2a-2c the sliding portions 20 extend all the way from the friction surface 16 to the opposite surface 18, thereby interconnecting the friction surface 16 with the opposite surface 18. In other exemplary embodiments the sliding portion 20 or sliding portions 20 may extend only part of the way between the friction surface 16 and the opposite surface 18.

The friction surface 16 lies in a geometrical plane, wherein the at least one sliding portion extends at an angle α of 3°-45°, such as 5°-30°, for example 7°-15° relative to a normal to said geometrical plane. When a vehicle is standing on a horizontal ground surface, the brake pad 10 is configured to be mounted such that said angle α is formed relative to the horizontal ground surface, and thus, relative to the central geometrical axis extending through the brake disc.

The friction surface 16 may extend in more than one geometric plane, however, each of the geometric planes extend in a vertical direction, i.e. upwardly from the lower side 14 to the upper side 12 of the brake pad 10. The above mentioned angle α relative to the normal will therefore be the same irrespective of which one of the geometrical planes the normal is taken from.

In FIGS. 2a-2c an optional spring element 28 is illustrated as being connected to upwardly projecting connectors 30 of the backing part 22. As will be explained below, the spring element 28 may assist in urging the brake pad 10 into a retracted position after the driver has released the brake pedal. The spring element 28 is intended to provide a downwardly directed force, i.e. supplementing the downwardly directed gravitational force. However, it should be understood that in other exemplary embodiments the spring element 28 may be omitted, as the inclination of the sliding portions 20 is enough for achieving the desired retraction, due to gravitational force and any vibrational forces conveyed for instance from the axle of the road wheel. In further embodiments other spring element configurations may be provided, which are connected differently to the backing part 22 or to some other part of a brake arrangement.

In the following the sliding portions 20 of the brake pad will be referred to as first sliding portions 20, in order to avoid confusion when discussing herein below sliding portions of a carrier, the latter ones will be referred to as second sliding portions.

Figure 3:
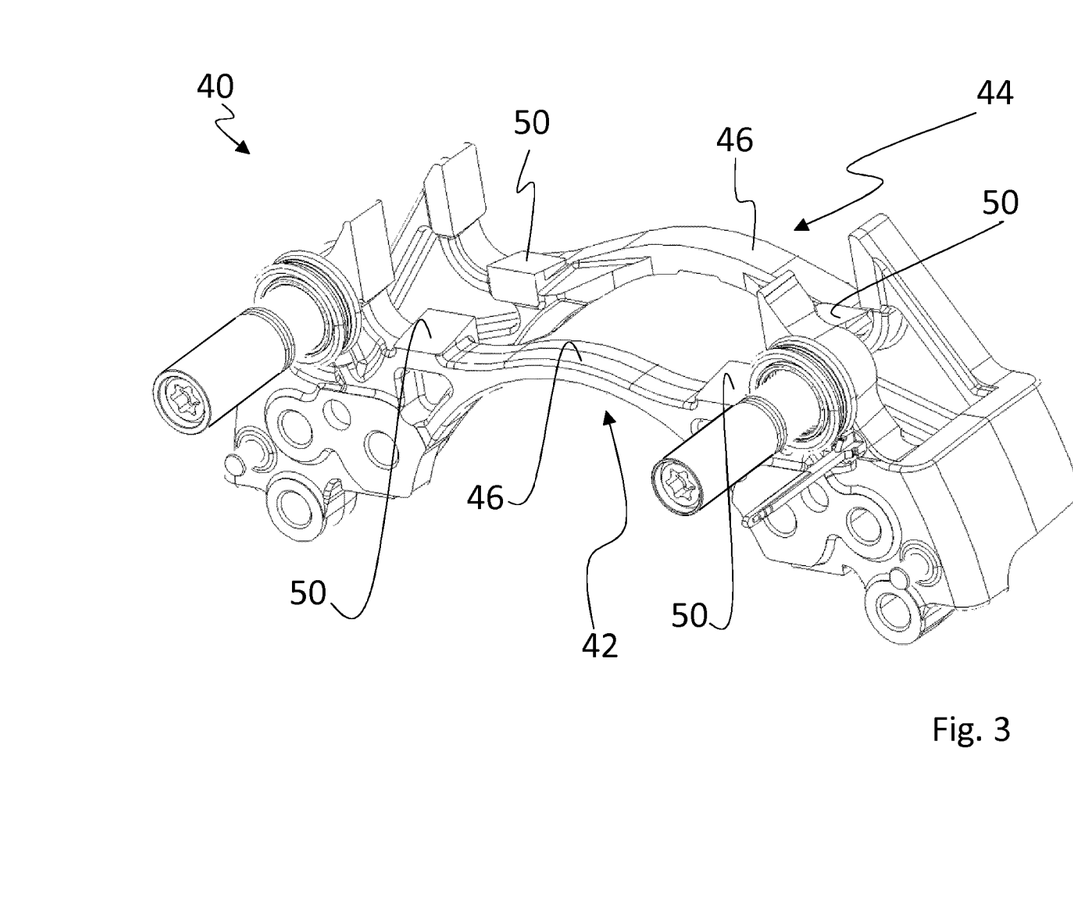
FIG. 3 illustrates a carrier for use in a brake arrangement in accordance with at least one exemplary embodiment of the invention.

FIG. 3 illustrates a carrier 40 for use in a brake arrangement in accordance with at least one exemplary embodiment of the invention. In accordance with the invention, a brake arrangement comprises a carrier (such as carrier 40 in FIG. 3) and a brake pad (such as brake pad 10 in FIGS. 2a-2c). The carrier 40 comprises an inner part 42 and an outer part 44. The inner part 42 is adapted to be positioned on an inner side of the brake disc, i.e. on the side closest to the centre of the vehicle. The outer part 44 is adapted to be positioned on an outer side of the brake disc, i.e. on the side farthest from the centre of the vehicle. Each one of the inner part 42 and the outer part 44 has a pair of sliding portions 50, herein referred to as second sliding portions 50 (in order to differentiate them from the sliding portions of the brake pad, such as the brake pad of FIG. 1, which may be referred to as first sliding portions 20). Each pair of second sliding portions 50 are separated by a distance which corresponds to the separating distance between the first sliding portions of the brake pad. In use, the second sliding portions 50 of the carrier 40 are configured to receive first sliding portions of a brake pad, and allow said first sliding portions to slide along the second sliding portions 50. Thus, the inner part 42 of the carrier 40 will support one brake pad, while the outer part 44 of the a carrier 40 will support another brake pad. The two brake pads will be enabled to slide on the second sliding portions 50 towards the brake disc in order to squeeze the brake disc in between the brake pads, when a driver applies the brake of the vehicle, and the two brake pads will be enabled to slide away from the brake disc to a retracted position when the driver releases the brake.

The second sliding portions 50 on the inner part 42 of the carrier 40 taper downwardly in a direction extending from the outer side towards the inner side of the brake disc, i.e. in a direction away from the brake disc and towards the centre of the vehicle. The second sliding portions 50 on the outer part 44 of the carrier taper downwardly in a direction extending from the inner side towards the outer side of the brake disc, i.e. in a direction away from the brake disc and away from the centre of the vehicle. Thus, the two pairs of second sliding portions 50 taper in opposite directions, both being directions away from the brake disc which is intended to be interposed between the two pairs of second sliding portions 50.

Both the inner part 42 and the outer part 44 of the carrier 40 comprise a respective arched portion 46, which separate the second sliding portions 50 from each other in each pair of second sliding portions 50. In the illustrated exemplary embodiment, the arched portions 46 of the carrier 40 do not taper downwardly, however, in other exemplary embodiments, the arched portions may have a taper corresponding to the taper of the second sliding portions flanking the arched portions.

According to at least some exemplary embodiments, the second sliding portions 50 of the carrier 40 and the first sliding portions of the brake pads have the same angle of inclination relative to the friction surface of the brake pads when they have been received by the carrier.

Figure 4:
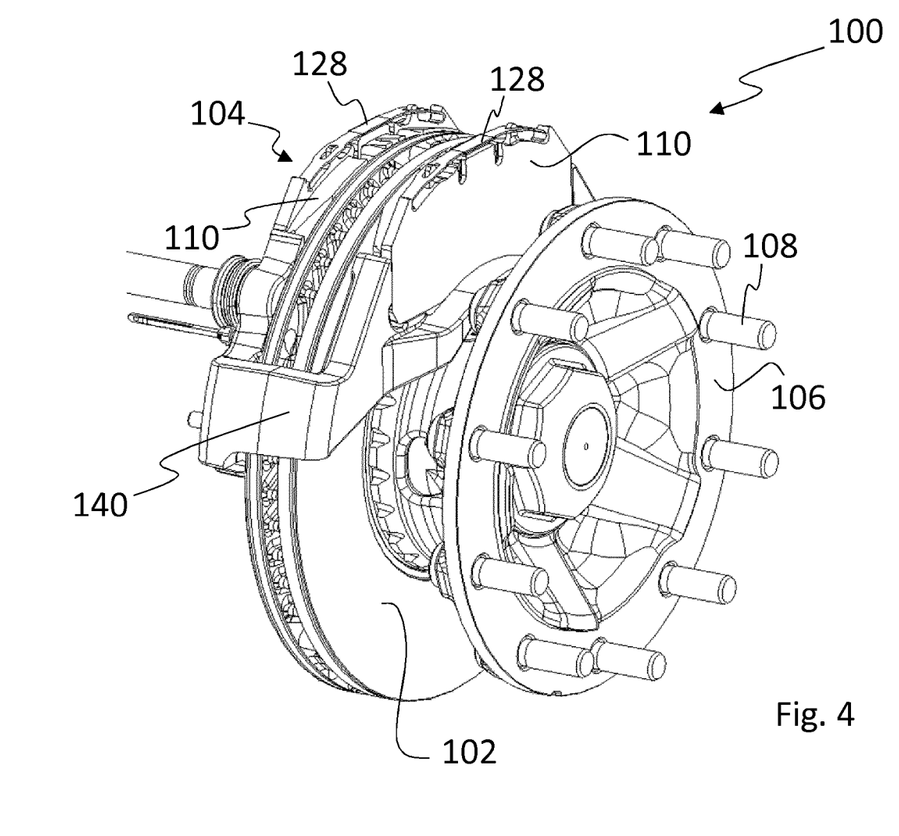
FIG. 4 illustrates a brake system in accordance with at least one exemplary embodiment of the invention.

FIG. 4 illustrates a brake system 100 in accordance with at least one exemplary embodiment of the invention. The brake system comprising a brake disc 102 and a brake arrangement 104 (here illustrated as two brake pads 110 mounted to a carrier 140, such as brake pads of the type illustrated in FIGS. 2a-2c mounted to a carrier of the type illustrated in FIG. 3). The brake disc 102 is rotatable around a geometrical centre axis, wherein the carrier 140 is mounted so as to enable the friction surface of the brake pads 110 to be pressed against the brake disc 102 when the brake pads 110 are subjected to a force directed towards the brake disc 102. The first sliding portions (of the brake pads 110) and the second sliding portions (of the carrier 140) taper towards the geometrical centre axis as seen in a direction facing away from the brake disc 102, wherein the tapering enables the brake pads 110 to move away from the brake disc 102 due to vibrations and/or gravitation.

Outside the brake disc 102 there may, in a conventional way be provided a wheel hub 106 with a plurality of wheel studs 108 for receiving a road wheel (such as one of the road wheels schematically illustrated in FIG. 1).

FIG. 4 also illustrates that the brake arrangement 104 in the brake system 100 comprises two spring elements 128 (such as of the type of spring element 28 illustrated in FIGS. 2a-2c) urging the first sliding portions of each brake pad 110 against the second sliding portion of each one of the inner part and outer part of the carrier 140, by a downwardly directed spring force. This downwardly directed force, similar to the downwardly directed gravitational force will (when the brake is not applied) cause the brake pads 110 to slide away from the brake disc 102, due to the downwardly inclined surfaces of the sliding portions.

Figure 5:
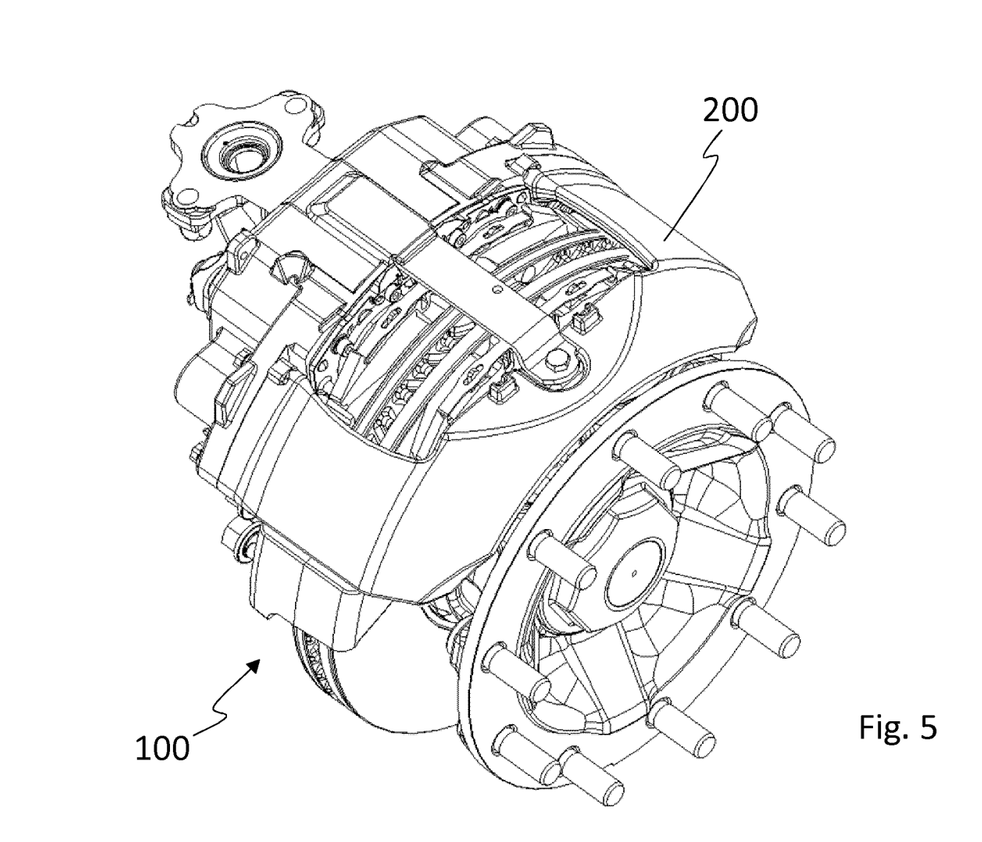
FIG. 5 illustrates a caliper provided to control the activation of the brake pads in the brake system of FIG. 4.

FIG. 5 illustrates a caliper 200 provided to control the activation of the brake pads 110 in the brake system 100 of FIG. 4.

Figure 6:
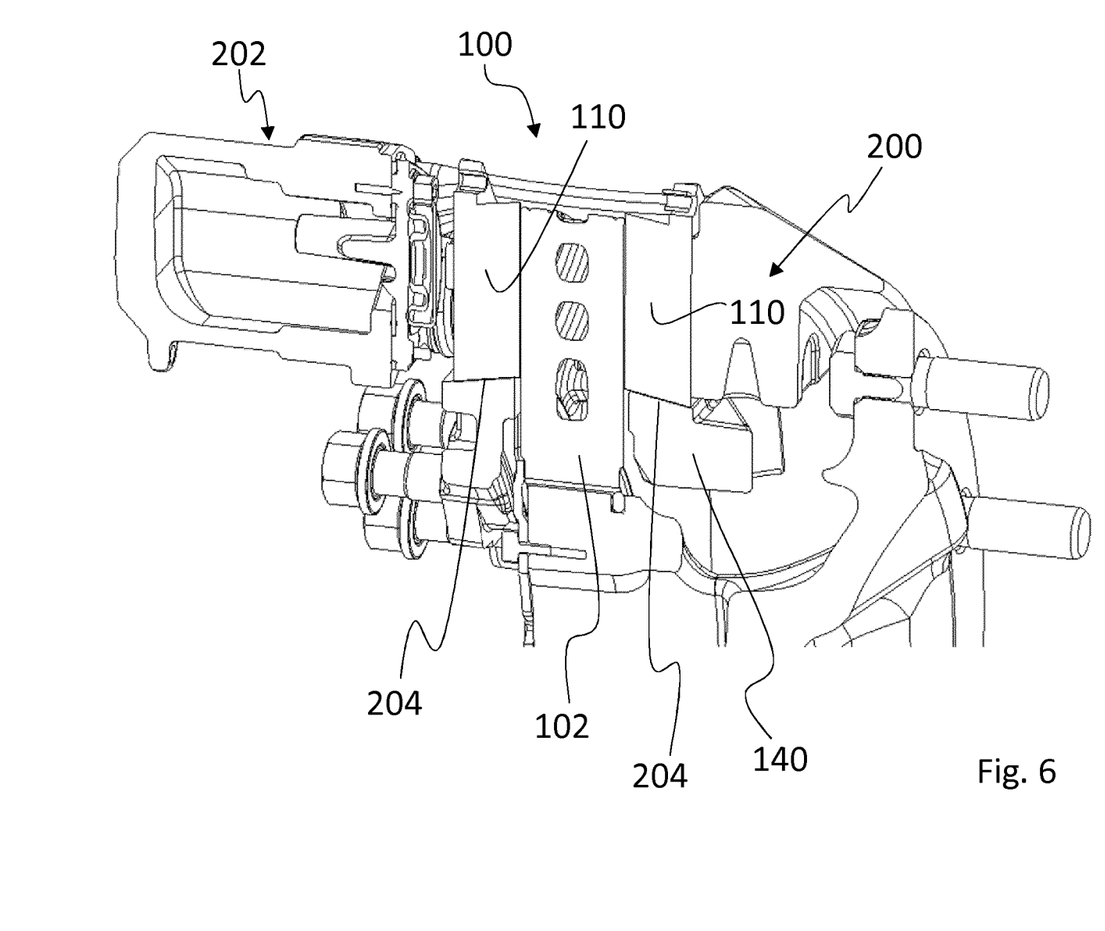
FIG. 6 is a cross-sectional detailed view of a the caliper and brake system in FIG. 5.

FIG. 6 is a cross-sectional detailed view of the caliper 200 and brake system 100 in FIG. 5.

As illustrated in FIG. 5, and in particular in FIG. 6, the caliper 200 may be a conventional caliper for controlling the movement of the brake pads 110. Thus, the caliper 200 has a pump arrangement 202. When a driver applies the brake, for instance presses the brake pedal, hydraulic fluid in the pump arrangement 202 will cause the brake pads 110 to slide upwardly along the inclined interface 204 formed by the mating sliding portions of the brake pads 110 and of the carrier 140, respectively, and will cause the respective friction surface of the brake pads 110 to be pressed against the brake disc 102. By squeezing the brake disc 102 between the brake pads 110, the produced friction will reduce the rotational speed of the brake disc 102, and thereby reducing the speed of the vehicle. When the driver releases the brake and the hydraulic pressure ceases, the inclined interface 204 (comprising the first sliding portions of the brake pads 110 and the second sliding portions of the carrier 140) will, due to gravitational force, and any vibrations (and optionally due to a downwardly pressing spring element) urge the brake pads 110 in an opposite direction. That is, the brake pads 110 will move downwardly along the inclined interface 204 and away from the brake disc 102, thereby reducing the risk of drag.

Figure 7:
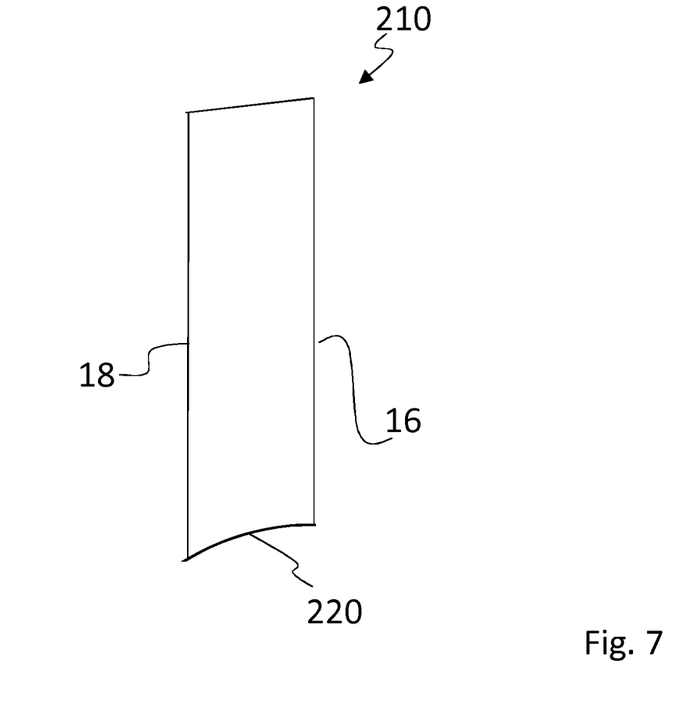
FIG. 7 illustrates schematically a side-view of a brake pad in accordance with at least another exemplary embodiment of the invention.

FIG. 7 illustrates schematically a side-view of a brake pad 210 in accordance with at least another exemplary embodiment of the invention. The brake pad 210 has a friction surface 16 and an opposite surface 18. The brake pad 210 has a sliding portion 220 having a curved extension (like an arc of a circle) from the friction surface 16 to the opposite surface 18. The sliding portion 220 may, however, in other embodiments extend a shorter distance, and may have a different curved form. A line contact is achievable between the sliding portion 220 and a mating sliding portion of the carrier, if the mating sliding portion has a different form, for instance, non-curved. This facilitates the retraction of the brake pad after the brake is released by the driver, due to the low line contact friction between the sliding portions. FIG. 7 have only been illustrated very schematically to show the principle of using a curved sliding portion. It should, however, be understood that the brake pad may have various other features, such as those described elsewhere in this application. For instance, the brake pad 210 may comprise a backing part and a consumable lining part, wherein the sliding portion is formed by both or only one of said parts. The brake pad 210 may have two or more sliding portions spaced apart from each other, and any other compatible feature already described in this disclosure.

Figures 8A, 8B:
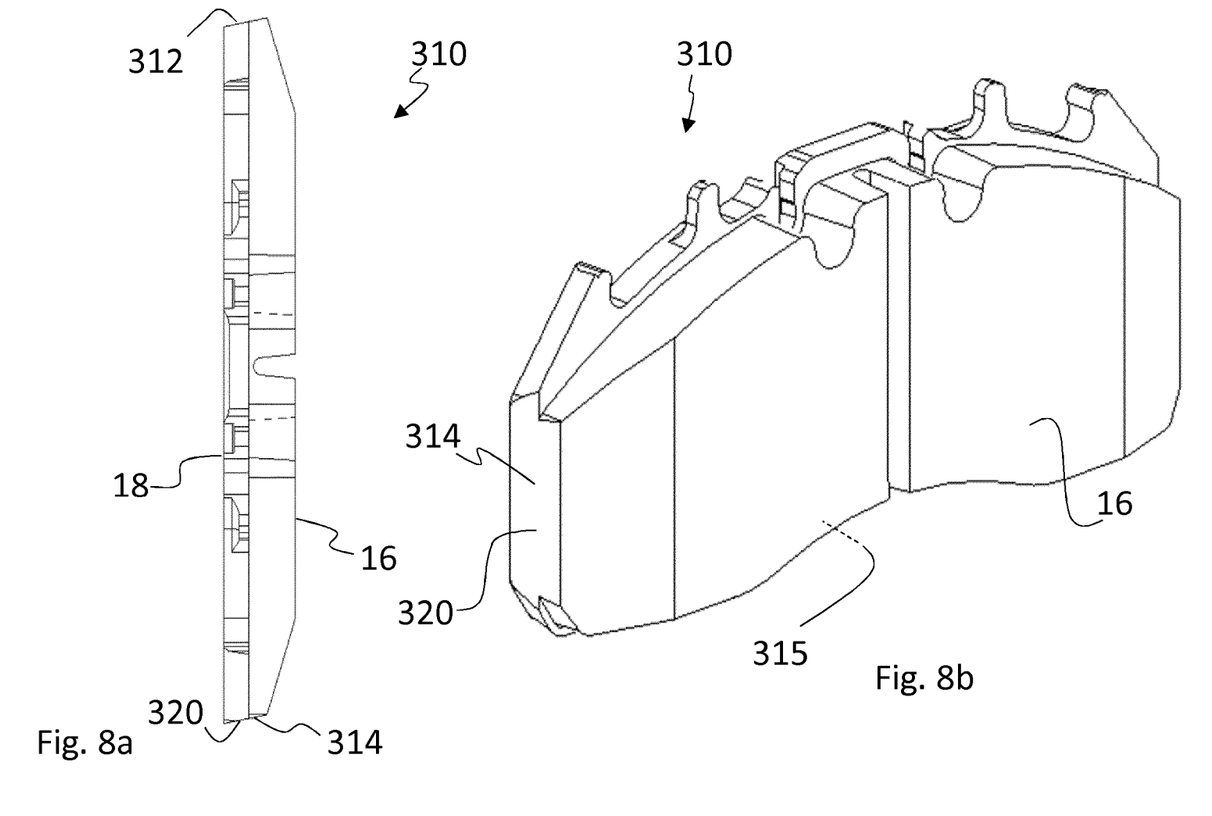
FIGS. 8a-8b illustrate a brake pad in accordance with at least a further exemplary embodiment of the invention.

FIGS. 8a-8b illustrate a brake pad 310 in accordance with at least a further exemplary embodiment of the invention. FIG. 8a is a side view of the brake pad 310 and FIG. 8b is a perspective view of the brake pad 310. The brake pad 310 is configured for use in a caliper which, compared to the position of the caliper in FIG. 5 is displaced 90° along the circumference of the brake disc, i.e. at a position corresponding to "3 o'clock" or "9 o'clock".

Just like in the previously discussed exemplary embodiments, the brake pad 310 of FIGS. 8a-8b comprises a friction surface 16 and an opposite surface 18. However, in FIGS. 8a-8b, the upper side 312 and the lower side 314 have shorter extensions than in the other drawing figures since this brake pad 310 is intended to be placed at a different position around the brake disc. The brake pad 310 comprises a longer lateral side 315 extending in one direction from the upper side 312 to the lower side 314 and extending in another direction from the friction surface 16 to the opposite surface 18, wherein the lateral side 315 is adapted to face in a direction towards said geometrical centre axis.

The lower side 314 of the brake pad 310 comprises a sliding portion 320 (here illustrated as a straight sliding portion, however, in other embodiments it may be curved) which extends downwards towards the opposite surface 18. The sliding portion 320 is configured to slide against a mating sliding portion of a carrier, and the downwards extension of the sliding portion 320 will in combination with gravitational force and possibly vibrational forces cause the brake pad to be retracted from the brake disc, when the driver has released the brake pedal.

Figure 9:
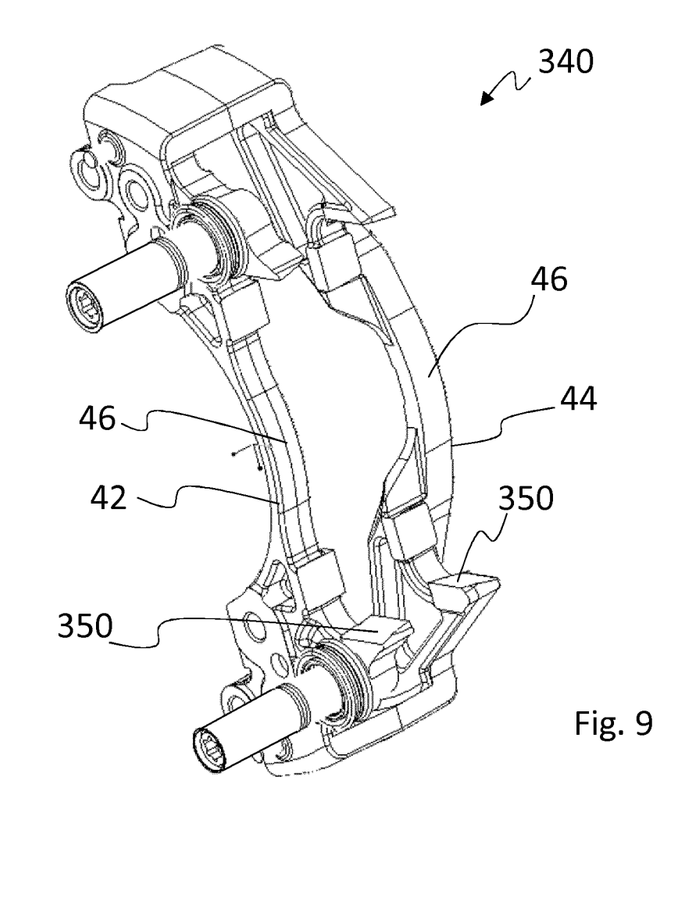
FIG. 9 illustrates a carrier for use in a brake arrangement in accordance with at least another exemplary embodiment of the invention.

FIG. 9 illustrates a carrier 340 for use in a brake arrangement in accordance with at least another exemplary embodiment of the invention. The carrier 340 may suitably be used for receive a brake pad 310 according to FIGS. 8a-8b and, thus for mounting with a caliper laterally (instead of on top of the brake disc), as explained previously. The carrier 340 has receiving sliding portions, second sliding portions 350, for receiving the sliding portions of two brake pads.

Similarly to the embodiment of FIG. 3, the carrier 340 of FIG. 9 has an inner part 42 and an outer part 44, both of which comprise a respective arched portion 46. The second sliding portions 350 extend substantially perpendicularly to the arched portions 46. The second sliding portions 350 taper downwardly away from the brake disc, and may suitably have the same angle of taper as the sliding portions of the brake pad to be received, such as the brake pad 310 of FIGS. 8a-8b.

It should be understood that in some exemplary embodiments, a brake pad may be configured as a hybrid between the brake pad of FIGS. 2a-2c and the brake pad of FIG. 8a-8b. For instance, a lateral side of the brake pad, such as the brake pad of FIGS. 8a-8b, may be provided with additional sliding portions. Such additional sliding portions would also be provided with a taper getting closer to the geometrical centre axis of the brake disc as the additional sliding portion extends towards the opposite surface. Thus, such a hybrid embodiment could be used in connection with a carrier and a caliper position as illustrated in FIGS. 3-5, or in connection with a carrier as illustrated in FIG. 9 and a 90° displaced caliper position.

It is to be understood that the present invention is not limited to the embodiments described above and illustrated in the drawings; rather, the skilled person will recognize that many changes and modifications may be made within the scope of the appended claims.

The invention claimed is:

1. A brake pad for a vehicle, comprising:
   an upper side,
   a lower side,
   a friction surface extending downwardly from the upper side to the lower side and being adapted to be pressed against a brake disc, and
   an opposite surface extending downwardly from the upper side to the lower side and being adapted to be faced away from the brake disc,
   wherein the lower side comprises at least one sliding portion configured to slide against a mating sliding portion of a carrier, the at least one sliding portion extends downwards towards the opposite surface,
   wherein the lower side is adapted to face in a direction towards a geometrical center axis of the brake disc, and
   wherein the upper side is adapted to face away from the geometrical center axis of the brake disc.

2. The brake pad of claim 1, wherein the at least one sliding portion extends obliquely downwards towards the opposite surface.

3. The brake pad of claim 1, wherein the at least one sliding portion extends in a curvature downwards towards the opposite surface.

4. The brake pad of claim 1,
   further comprising a backing part and a consumable lining part fixedly mounted to the backing part,
   wherein the friction surface is provided on the lining part and the opposite surface is provided on the backing part,
   wherein the downwardly extending sliding portion is formed by both the backing part and the lining part.

5. The brake pad of claim 1, wherein the at least one sliding portion extends from the friction surface to the opposite surface interconnecting the friction surface with the opposite surface.

6. The brake pad of claim 2,
   wherein the friction surface extends in a geometrical plane,
   wherein the at least one sliding portion extends at an angle of 3°-45° relative to the geometrical plane.

7. The brake pad of claim 1, wherein the at least one sliding portion comprises at least two sliding portions spaced apart from each other.

8. The brake pad of claim 7, wherein the two sliding portions are located on respective sides of a plane of symmetry of the brake pad.

9. The brake pad of claim 1, wherein the friction surface is adapted to be pressed against the brake disc above the geometrical center axis.

10. The brake pad of claim 1, further comprising a lateral side extending in one direction from the upper side to the lower side and extending in another direction from the friction surface to the opposite surface, wherein the lateral side is adapted to face in a direction towards the geometrical center axis.

11. A brake arrangement comprising:
    a brake pad, comprising:
       an upper side,
       a lower side,
       a friction surface extending downwardly from the upper side to the lower side and being adapted to be pressed against a brake disc, and
       an opposite surface extending downwardly from the upper side to the lower side and being adapted to be faced away from the brake disc,
       wherein the lower side comprises at least one sliding portion extending downwards towards the opposite surface, and
    a carrier adapted to be mounted to the brake disc,
    wherein the sliding portion of the brake pad is a first sliding portion,
    wherein the carrier comprises a second sliding portion mating with the first sliding portion,
    wherein the brake pad with the first sliding portion is enabled to slide along the second sliding portion towards and away from the brake disc,
    wherein the lower side is adapted to face in a direction towards a geometrical center axis of the brake disc, and
    wherein the upper side is adapted to face away from the geometrical center axis of the brake disc.

12. The brake arrangement of claim 11, wherein the second sliding portion and the first sliding portion have the same angle of inclination relative to the friction surface of the brake pad.

13. The brake arrangement of claim 11, further comprising a spring element urging the first sliding portion against the second sliding portion by a downwardly directed spring force.

14. A brake system comprising:
    a brake disc which is rotatable around a geometrical center axis;
    a brake arrangement, comprising:
       a brake pad, comprising:
          an upper side,
          a lower side,
          a friction surface extending downwardly from the upper side to the lower side and being adapted to be pressed against the brake disc, and
          an opposite surface extending downwardly from the upper side to the lower side and being adapted to be faced away from the brake disc,
          wherein the lower side comprises at least one sliding portion extending downwards towards the opposite surface, and
       a carrier adapted to be mounted to the brake disc,
       wherein the sliding portion of the brake pad is a first sliding portion,
       wherein the carrier comprises a second sliding portion mating with the first sliding portion, and
       wherein the brake pad with the first sliding portion is enabled to slide along the second sliding portion towards and away from the brake disc, and
    wherein the carrier is mounted so as to enable the friction surface of the brake pad to be pressed against the brake disc when the brake pad is subjected to a force directed towards the brake disc,
    wherein the lower side is adapted to face in a direction towards the geometrical center axis of the brake disc, and
    wherein the upper side is adapted to face away from the geometrical center axis of the brake disc.

15. The brake system of claim 14, wherein the first sliding portion and the second sliding portion taper downwardly wherein the tapering enables the brake pad to move away from the brake disc due to vibrations and/or gravitation.

* * * * *